(12) United States Patent
Okonnen et al.

(10) Patent No.: US 7,369,851 B2
(45) Date of Patent: May 6, 2008

(54) COMMUNICATIONS NETWORK CAPABLE OF DETERMINING SIM CARD CHANGES IN ELECTRONIC DEVICES

(75) Inventors: Harri Okonnen, Dana Point, CA (US); Bindu Rama Rao, Laguna Niguel, CA (US); Ziaul Jami Huq, Rancho Santa Margarita, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 542 days.

(21) Appl. No.: 10/417,285

(22) Filed: Apr. 15, 2003
(Under 37 CFR 1.47)

(65) Prior Publication Data
US 2004/0166839 A1 Aug. 26, 2004

Related U.S. Application Data

(60) Provisional application No. 60/386,199, filed on Apr. 19, 2002.

(51) Int. Cl.
*H04Q 7/20* (2006.01)
(52) U.S. Cl. .............. 455/435.1; 455/410; 455/425
(58) Field of Classification Search ..... 455/556.1–558, 455/410, 411, 345.1
See application file for complete search history.

(56) References Cited

U.S. PATENT DOCUMENTS

| 5,261,055 A | 11/1993 | Moran et al. ............... 395/275 |
| 5,442,771 A | 8/1995 | Filepp et al. ............... 395/650 |
| 5,479,637 A | 12/1995 | Lisimaque et al. .......... 395/430 |
| 5,579,522 A | 11/1996 | Christeson et al. ......... 395/652 |
| 5,596,738 A | 1/1997 | Pope ........................ 395/430 |
| 5,598,534 A | 1/1997 | Haas ..................... 395/200.09 |
| 5,608,910 A | 3/1997 | Shimakura .................. 395/670 |
| 5,623,604 A | 4/1997 | Russell et al. ............ 395/200.1 |
| 5,666,293 A | 9/1997 | Metz et al. ............... 395/200.5 |
| 5,752,039 A | 5/1998 | Tanimura .................... 395/712 |
| 5,778,440 A | 7/1998 | Yiu et al. ................... 711/154 |
| 5,790,974 A | 8/1998 | Tognazzini ................. 701/204 |
| 5,878,256 A | 3/1999 | Bealkowski et al. ........ 395/652 |

(Continued)

FOREIGN PATENT DOCUMENTS

CA  2339923  3/2000

(Continued)

OTHER PUBLICATIONS

"Focus on OpenView A guide to Hewlett-Packard's Network and Systems Management Platform", Nathan J. Muller, pp. 1-291, CBM Books, published 1995.

(Continued)

*Primary Examiner*—Duc M. Nguyen
*Assistant Examiner*—Justin Lee

(57) ABSTRACT

A communication network comprising a carrier network with a service coordinator is capable of acting upon SIM card change information detected by an agent located in the electronic devices used in the communication network. In general, the agent in electronic devices facilitates the determination of SIM Card changes in the electronic device. It also facilitates the selective reporting of such changes to the carrier network. In one embodiment, the communication network is capable of detecting SIM Card changes in the electronic device. In general, the carrier network determines updates to firmware, software, configuration etc. necessitated by the change in SIM card and selectively communicates it to the electronic device.

39 Claims, 5 Drawing Sheets

U.S. PATENT DOCUMENTS

| | | | |
|---|---|---|---|
| 5,960,445 A | 9/1999 | Tamori et al. | 707/203 |
| 5,987,325 A * | 11/1999 | Tayloe | 455/435.2 |
| 6,009,497 A | 12/1999 | Wells et al. | 711/103 |
| 6,038,636 A | 3/2000 | Brown, III et al. | 711/103 |
| 6,064,814 A | 5/2000 | Capriles et al. | 395/701 |
| 6,073,206 A | 6/2000 | Piwonka et al. | 711/102 |
| 6,073,214 A | 6/2000 | Fawcett | 711/133 |
| 6,088,759 A | 7/2000 | Hasbun et al. | 711/103 |
| 6,105,063 A | 8/2000 | Hayes, Jr. | 709/223 |
| 6,112,024 A | 8/2000 | Almond et al. | 395/703 |
| 6,112,197 A | 8/2000 | Chatterjee et al. | 707/3 |
| 6,126,327 A | 10/2000 | Bi et al. | 395/200.51 |
| 6,128,695 A | 10/2000 | Estakhri et al. | 711/103 |
| 6,138,002 A * | 10/2000 | Alperovich et al. | 455/407 |
| 6,148,192 A * | 11/2000 | Ahvenainen | 455/410 |
| 6,157,559 A | 12/2000 | Yoo | 365/52 |
| 6,163,274 A | 12/2000 | Lindgren | 340/825.44 |
| 6,198,946 B1 | 3/2001 | Shin et al. | 455/561 |
| 6,263,214 B1 * | 7/2001 | Yazaki et al. | 455/558 |
| 6,279,153 B1 | 8/2001 | Bi et al. | 717/11 |
| 6,311,322 B1 | 10/2001 | Ikeda et al. | 717/1 |
| 6,353,737 B1 * | 3/2002 | Herzog | 455/418 |
| 6,438,585 B2 | 8/2002 | Mousseau et al. | 709/206 |
| 6,591,098 B1 * | 7/2003 | Shieh et al. | 455/419 |
| 6,842,628 B1 * | 1/2005 | Arnold et al. | 455/556.2 |
| 2001/0029178 A1 | 10/2001 | Criss et al. | 455/419 |
| 2001/0047363 A1 | 11/2001 | Peng | 707/104.1 |
| 2001/0048728 A1 | 12/2001 | Peng | 375/354 |
| 2002/0078209 A1 | 6/2002 | Peng | 709/227 |
| 2002/0116261 A1 | 8/2002 | Moskowitz et al. | 705/14 |
| 2002/0131404 A1 | 9/2002 | Mehta et al. | 370/352 |
| 2002/0152005 A1 | 10/2002 | Bagnordi | 700/234 |
| 2002/0156863 A1 | 10/2002 | Peng | 709/217 |
| 2002/0157090 A1 | 10/2002 | Anton, Jr. | 717/178 |
| 2003/0033599 A1 | 2/2003 | Rajaram et al. | 717/173 |
| 2003/0037075 A1 | 2/2003 | Hannigan et al. | 707/500 |
| 2003/0061384 A1 | 3/2003 | Nakatani | 709/245 |
| 2003/0195951 A1 * | 10/2003 | Wittel et al. | 709/220 |
| 2004/0068721 A1 * | 4/2004 | O'Neill et al. | 717/168 |
| 2004/0078427 A1 * | 4/2004 | Gil et al. | 709/203 |
| 2004/0093342 A1 * | 5/2004 | Arbo et al. | 707/102 |
| 2004/0215755 A1 * | 10/2004 | O'Neill | 709/223 |

FOREIGN PATENT DOCUMENTS

| | | |
|---|---|---|
| JP | 8202626 | 8/1996 |
| KR | 2002-0034228 | 5/2000 |
| KR | 2001-0100328 | 11/2001 |

OTHER PUBLICATIONS

"Client Server computing in mobile environments", J. Jing et al, ACM Computing Surveys, vol. 31, Issue 2, pp. 117-159, ACM Press, Jul. 1999.

"ESW4: enhanced scheme for WWW computing in wireless communication environments", S. Hadjiefthymiades, et al, ACM SIGCOMM Computer Communication Review, vol. 29, Issue 5, pp. 24-35, ACM Press, Oct. 1999.

"Introducing quality-of-service and traffic classes in wireless mobile networks", J. Sevanto, et al, Proceedings, of the 1st ACM international workshop on Wireless mobile multimedia, pp. 21-29, ACM Press, 1998.

"Any Network, Any Terminal, Anywhere", A. Fasbender et al, IEEE Personal Communications, Apr. 1999, pp. 22-30, IEEE Press, 1999.

* cited by examiner

COMMUNICATIONS NETWORK CAPABLE OF DETERMINING SIM CARD CHANGES IN ELECTRONIC DEVICES

CROSS REFERENCE TO RELATED APPLICATIONS

This application claims priority to and the benefit of U.S. Provisional Patent Application Ser. No. 60/386,199, entitled "Communication Network Capable Of Determining SIM Card Changes In Electronic Devices", filed Apr. 19, 2002.

1. BACKGROUND

1. Technical Field

The present invention relates generally to the process determining changes to the setup of electronic devices, and, more specifically, to the determination of change of Subscriber Identity Module (SIM) card in an electronic device connected to a telecommunications network.

2. Related Art

Electronic devices, such as mobile phones and personal digital assistants (PDA's), often contain firmware and application software that are either provided by the manufacturers of the electronic devices, by telecommunication carriers, or by third parties. Electronic devices, such as GSM phones, often contain a SIM card reader that is employed to read information on SIM cards that are inserted by end users. SIM cards are expected to provide personal identity regardless of phone. The firmware and application software on such electronic devices often employ information contained in a SIM card to avail of services provided by service providers over the telecommunications network Quite often, SIM cards are used to specify the identification of the end user such that any device into which the SIM card is inserted assumes the identity provided by the SIM card. Services accessed by the end user using a SIM card in conjunction with an electronic device are often tailored by the service provider based on information provided by/from the SIM card. This approach has several inherent problems. For example, if the service provider provides content or service based on information provided by the SIM card, such content or information may not be compatible with the electronic device that currently holds the SIM card.

Typically, electronic devices that are handsets, such as GSM phones, PDA's etc. provide SIM card readers. In such devices, a service provider for services accessed from the handset does not know what the actual device type is that is being serviced. Only information provided by the SIM card in the handset is available to the service provider to determine the type of service or type of information to be provided to the end user. If the end user reuses the SIM card in another electronic device and accesses the service, the service provider does not know, and often cannot determine, that the electronic device has been changed. This is especially true of GSM phones where a wireless carrier does not know which wireless handsets type or make is associated with a given SIM card employed by a end user and therefore cannot easily determine the software or firmware that is available in the handset.

There is often a need to know which specific end user electronic device is associated with a end user's SIM card. There is also a need to determine the make, model and version of hardware and software available on the electronic device associated with a SIM card. Unfortunately, such information is not available to the service provider, only the contents of the SIM card, such as a user identification is provided to the service provider. This is a major problem that currently inhibits creation of new services for electronic handsets.

Quite often, new versions of the firmware and software are periodically released to fix the bugs or to introduce new features, or both. There is a fundamental problem in determining which electronic device needs the bug fixes if the service provider or the carrier is not able to accurately and reliably determine which electronic device is currently associated with a given SIM card.

Typically, attempts to upgrade firmware and/or software in electronic devices such as GSM phones are often hampered by limited user interaction capabilities and slow communication speeds on these devices and end user interactions cannot be resorted to, as they can be erroneous. Automating firmware and/or software upgrades, within a carrier network for example, requires the reliable determination of the actual device characteristics associated with a SIM card. When a SIM card is transferred from one electronic device to another, the service provider or the carrier needs to determine what changed. Unfortunately, determination of the change of SIM cards is not supported in most electronic devices and service providers and carriers are totally ignorant of such changes.

2. SUMMARY OF THE INVENTION

These and other objects of the present invention are achieved in an electronic device with a programmed card reader, the electronic device communicatively coupled to a carrier network and capable of communicating with the carrier network when any authorized programmed card is docked in the programmed card reader, the electronic device comprising an intelligent agent capable of communicating with the carrier network. In one embodiment, the intelligent agent detects the presence of the any authorized programmed card in the programmed card reader of the electronic device. The intelligent agent also detects when the any authorized programmed card is changed and, in response, communicates a programmed card changed event to the carrier network;

In a related embodiment, the intelligent agent determines that the any authorized programmed card that is currently employed in the programmed card reader of the electronic device in a current session is different from the any authorized programmed card employed during a previous session, and, in response, it communicates a programmed card changed event to the carrier network.

In another related embodiment, the electronic device communicates the programmed card changed event to the carrier network in order to initiate the determination of the availability of updates for the electronic device.

Again, in another related embodiment, the electronic device of communicates the programmed card changed event and device type information of the electronic device, wherein the event comprises identification information uniquely identifying the any authorized programmed card that is currently employed in the programmed card reader of the electronic device in the current session.

In yet another related embodiment, the device type information comprises a selective combination of manufacturer, model, hardware version number, firmware version number and/or software version number.

In one embodiment, the electronic device of further comprises a firmware, a software and a first agent component and a second agent component of the intelligent agent.

The first agent component communicates the programmed card changed event to the carrier network in order to initiate the determination of the availability of updates for the electronic device. It also receives one or more updates communicated by the carrier network in response to the programmed card changed event communicated by the electronic device. The second agent component of the intelligent agent applies the one or more updates to update or adapt the firmware and/or software in the electronic device.

In one embodiment, the electronic device from further comprises a programmed card in place of the any authorized programmed card that is inserted into the programmed card reader, a non-volatile storage area, and a stored data in the non-volatile storage area that is computed from information retrieved from the any authorized programmed card inserted into the programmed card reader. The intelligent agent is capable of accessing, from the non-volatile storage area, the stored data. It is also capable of reading an input data from the programmed card inserted into the programmed card reader. The intelligent agent reads the input data from the programmed card when the programmed card is inserted into the programmed card reader, compares it to the stored data stored in the non-volatile storage area whenever the programmed card is inserted into the programmed card reader, or whenever the electronic device is powered up, and detects a programmed card changed event only when the stored data does not match the input data. The intelligent agent communicates the programmed card changed event to the carrier network whenever it detects the programmed card changed event.

In another related embodiment, the intelligent agent receives updates communicated by the carrier network in response to the programmed card changed event communicated by the electronic device to the carrier network.

In another related embodiment, the electronic device communicates the programmed card changed event to a service provider via the carrier network, that is communicatively coupled to the carrier network, that responds to the programmed card changed event communicated to it.

In another embodiment, the electronic device of further comprises the intelligent agent capable of assembling or retrieving a device specific information from the electronic device wherein the intelligent agent communicates the device specific information and the input data from the programmed card to the carrier network along with the programmed card changed event.

In another embodiment, the electronic device is capable of interacting with the carrier network that maps the input data from the programmed card to the device specific information communicated by the intelligent agent.

In one embodiment, a carrier network comprises a first electronic device with an intelligent agent communicatively coupled to the carrier network, the first electronic device comprising a programmed card reader and a first programmed card associated with the carrier network or a service provided by the carrier network, a service coordinator that is communicatively coupled to the first electronic device. It also comprises a second electronic device with the intelligent agent and a second programmed card reader also communicatively coupled to the service coordinator. In addition, a first device specification in the first electronic device describes the device specifications of the first electronic device and a second electronic device specification in the second electronic device describes the device specifications of the second electronic device. The intelligent agent in the second electronic device detects the presence of the first programmed card, when the first programmed card is introduced into the second programmed card reader of the second electronic device, and communicates a first programmed card information retrieved from the first programmed card to the service coordinator along with the second electronic device specification.

In a related embodiment, the carrier network of further comprises the service coordinator storing the first programmed card information that it receives from the second electronic device when the first programmed card replaces the second programmed card in the second electronic device and a communication is received from the second electronic device containing the first programmed card information along with the second electronic device specification. The service coordinator determines that a programmed card changed event has occurred and the service coordinator also determines the availability of updates for the second electronic device based on received second electronic device specification. It then communicates the availability of updates to the second electronic device.

In another related embodiment, the carrier network of further comprises the service coordinator receiving the first programmed card information along with the second electronic device specification communicated by the intelligent agent in the second electronic device. The service coordinator maintains a saved mapping information that maps a plurality of known programmed card related information to associated known electronic devices. The service coordinator also detects a programmed card changed event by comparing the received first programmed card information to the saved mapping information. It then associates the first programmed card with the second electronic device specifications and stores an association information as part of the saved mapping information.

In one related embodiment, the carrier network of also comprises an intelligent agent in the second electronic device that detects the presence of the first programmed card and communicates a programmed card changed event to the service coordinator along with the second electronic device specification when the first programmed card is incorporated into the second programmed card reader of the second electronic device replacing the second programmed card. The service coordinator receives the programmed card changed event and the second electronic device specifications communicated by the intelligent agent in the second electronic device and associates the first programmed card information with the second electronic device specification and also creates a mapping that is saved for subsequent retrieval;

In a related embodiment, the carrier network of further comprises services associated with first programmed card information. The service coordinator facilitates delivery of the services associated with the first programmed card information and it also facilitates the continuation of the delivery of services associated with first programmed card information to the second electronic device after the first programmed card is removed from the first electronic device and incorporated into the second electronic device.

In a related embodiment, the carrier network of comprises the service coordinator connectively coupled to an external entity such as a manufacturer's portal environment or a service provider's server. The service coordinator receives the programmed card changed event communicated by the intelligent agent in the second electronic device and sends an associated message to the external entity.

In a related embodiment, the carrier network of further comprises a new service supported by the service coordinator. The service coordinator causes the external entity to selectively send at least one update package associated with the new service to the second electronic device from the external entity via the service coordinator in response to the associated message received by the external entity. The second electronic device becomes a dynamic platform by accepting and installing the at least one update package associated with the new service.

In another related embodiment of the carrier network, the second electronic device further comprises firmware and software wherein the at least one update package sent by the external entity to the second electronic device is an update to the firmware or the software, or both.

In a different embodiment, a mobile handset is communicatively coupled to a cellular wireless network. The mobile handset comprises a subscriber identity module that identifies a subscriber's subscription to the cellular wireless network, the subscriber identity module being mounted in a programmed card, the programmed card capable of being inserted into any mobile handset that will accept the programmed card, the subscriber identity module, when inserted into the mobile handset as part of the programmed card, providing the cellular wireless network information about the subscriber that is necessary for establishing a call, billing, etc., the mobile handset further comprising. The mobile handset also comprises a non-volatile storage, a previous card reference in the non-volatile storage for saving at least a portion of information provided by the subscriber identity module; and a device specification comprising at least a manufacturer, a model, a firmware version of the mobile handset. The mobile handset compares the saved previous card reference to at least a portion of the information provided by the current subscriber identity module, on powerup or on insertion of the programmed card containing the subscriber identity module into the mobile handset, and, if determined to be different, the mobile handset saves at least a portion of the information provided by the subscriber identity module in the previous card reference. In addition, the mobile handset communicates a subscriber identity module changed event to the cellular wireless network when it determines that the saved previous card reference does not match the at least a portion of the information provided by the current subscriber identity module.

3. BRIEF DESCRIPTION OF THE DIAGRAMS

The numerous objects and advantages of the present invention may be better understood by those skilled in the art by reference to the accompanying figures in which.

Figure 4:
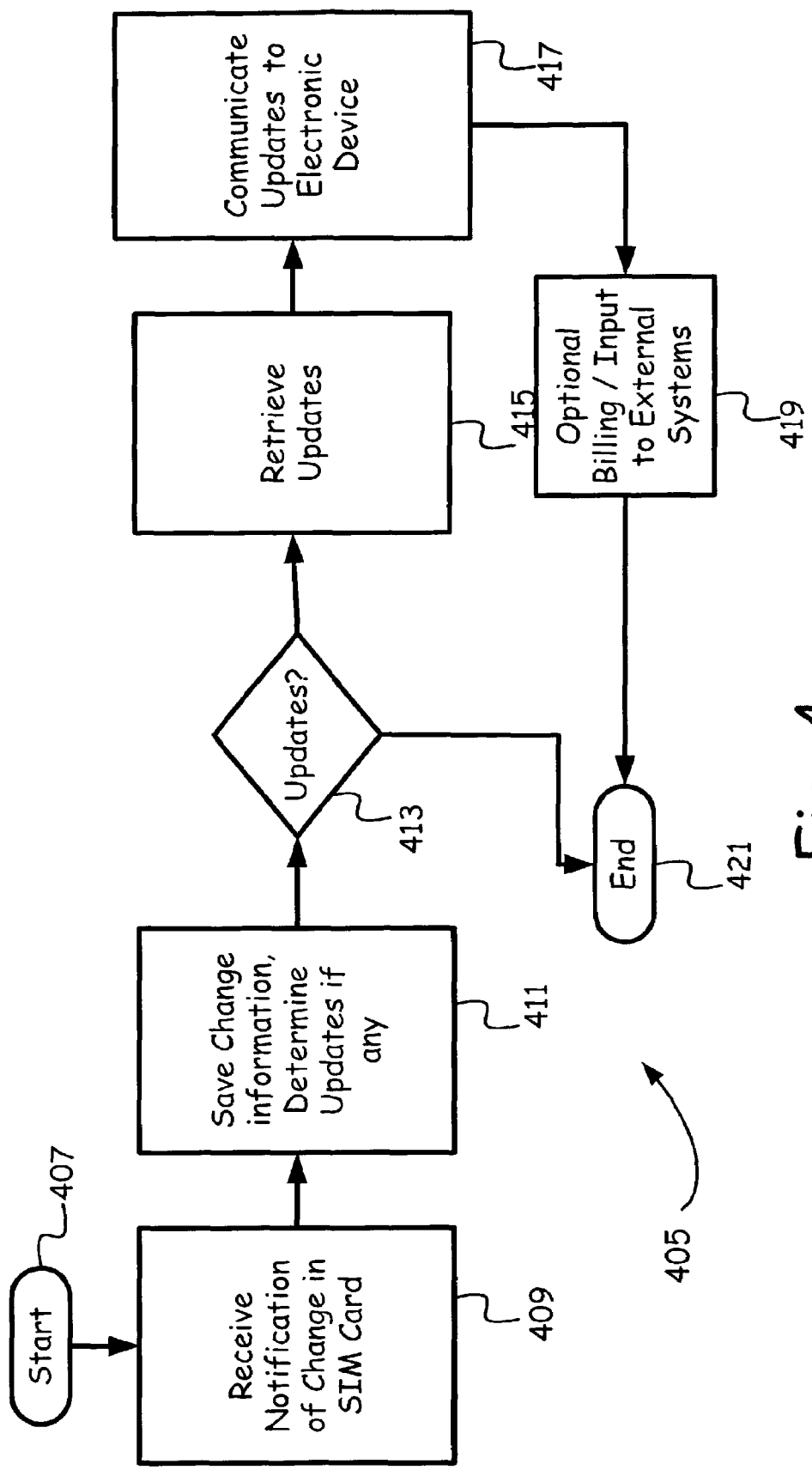
Figure 5:
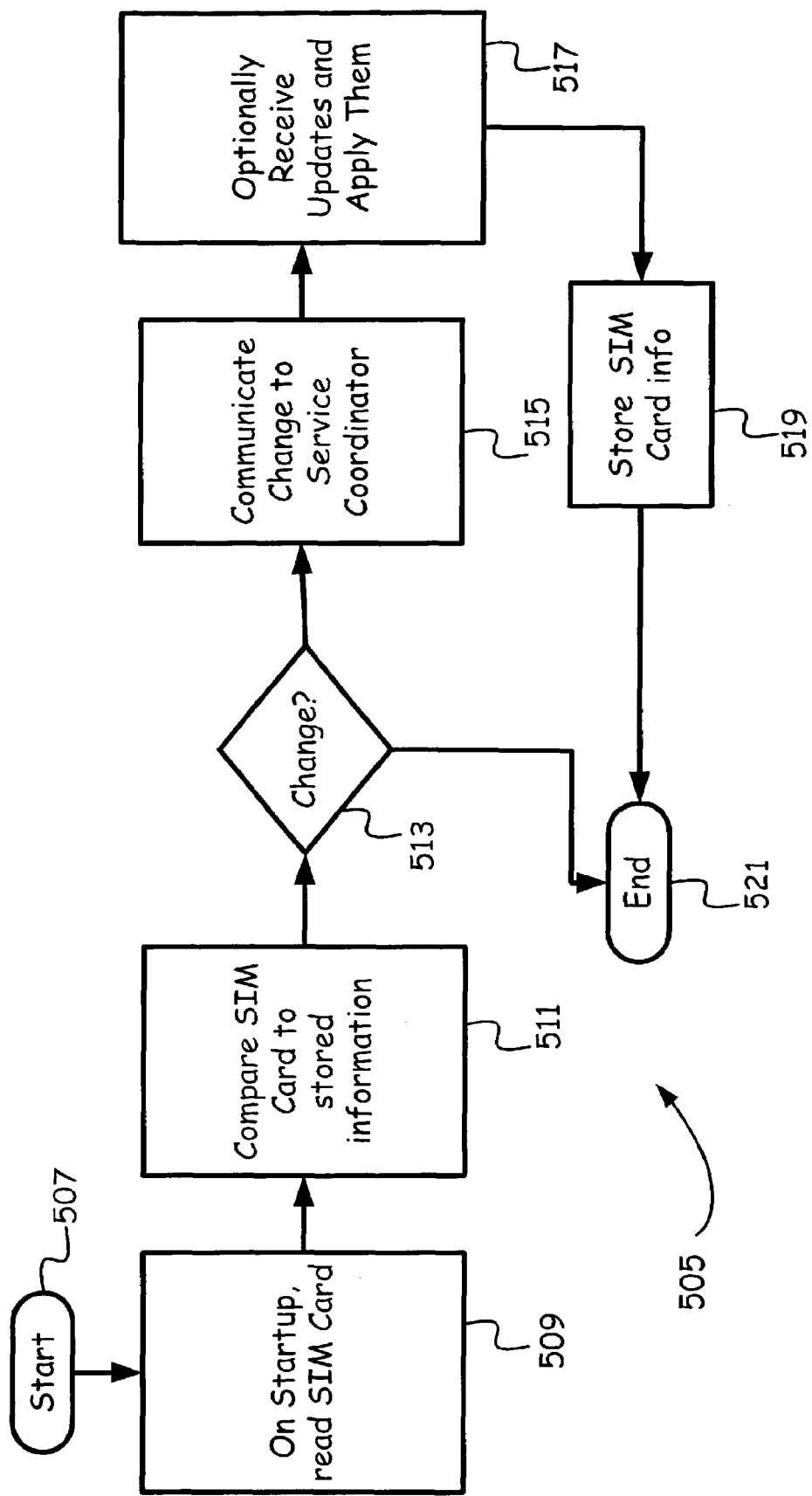

FIG. 4 describes exemplary operation of the service coordinator in response to SIM card change information received from the agent in the electronic device; and FIG. 5 is an exemplary flow chart for the operation of the agent that describes the process of determining a SIM card change based on SIM card information previously saved in the electronic device.

4. DETAILED DESCRIPTION OF THE DIAGRAMS

Figure 1:
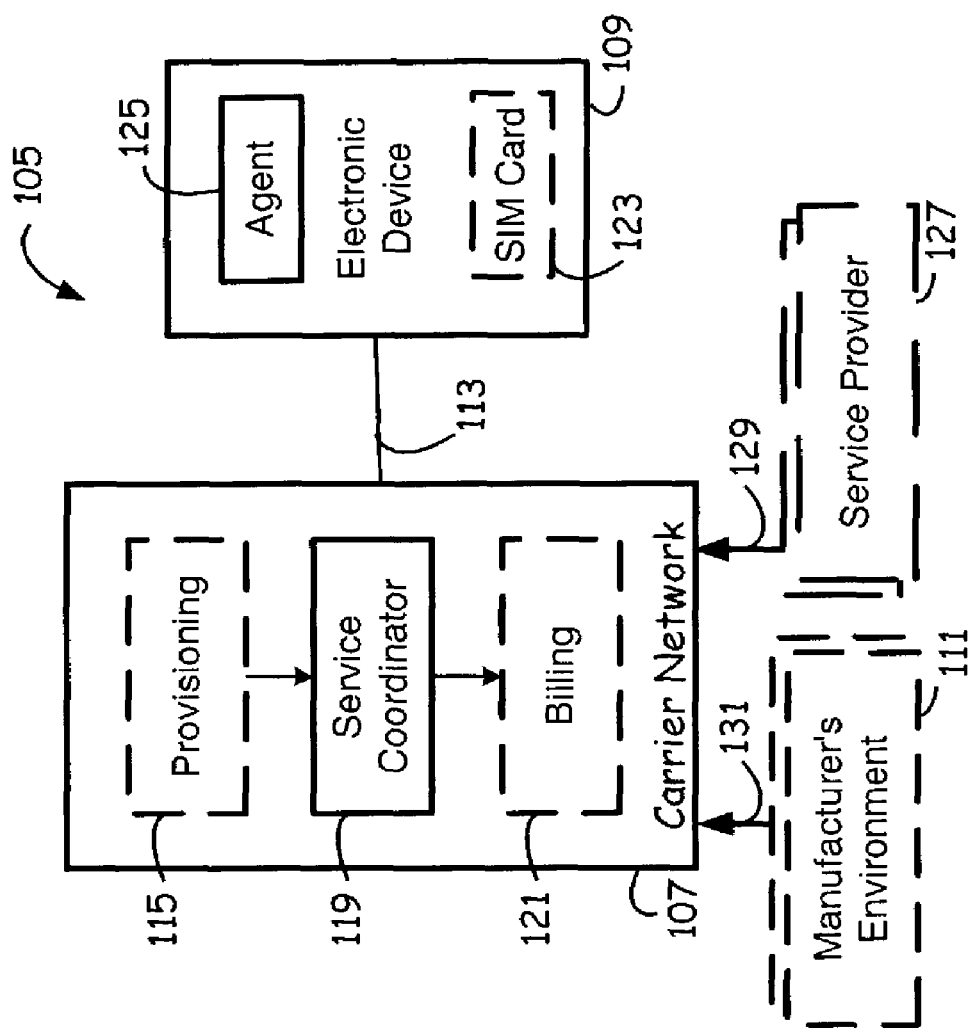
FIG. 1 is perspective block diagram of a communications network capable of determining SIM card changes in electronic devices comprising a carrier network, an optional manufacturer's environment, optional service providers and an electronic device capable of manipulating a SIM card, all communicatively coupled to the carrier network.

FIG. 1 is perspective block diagram of a communications network capable of determining SIM card changes in electronic devices comprising a carrier network 107, an optional manufacturer's environment 111, optional service providers 127 and an electronic device 109 capable of manipulating a SIM card, all communicatively coupled to the carrier network. The electronic device 109 comprises a agent 125 and an optional SIM card 123 and is capable of determining when a SIM card is changed. For example, it is capable of determining if one SIM card 123 is removed and a different SIM card 123 is introduced into the electronic device 109. The carrier network 107, in addition to comprising telecommunications equipment such as switches, routers, etc. and telecommunication software, also comprises a service coordinator 119, an optional provisioning system 115 and an optional billing system 121.

In general, the agent 125 facilitates determination of SIN Card changes in the electronic device 125. It also facilitates the selective reporting of such changes to the carrier network 107. In addition, the determination of changes to information contained in the SIM card 123 can also be detected and acted upon by the electronic device 109.

The agent 125 of the electronic device 109 is capable of determining when a SIM card has changed and reports the event to the service coordinator 119. The agent 125 of the electronic device 109 is also capable of determining the device type in terms of make, model, version numbers (for hardware, software, firmware, etc.) and reporting it to the service coordinator 119 in conjunction with reports of change in SIM card, when detected.

The service coordinator 119 facilitates interactions of the carrier network 107 with the agent 125 of the electronic device 109, with the manufacturer's environment(s) 11 and with service provider(s) 127. It receives SIM card change reports from agents in a plurality of electronic devices 109 and selectively saves them in its database. When the agent 125 reports a change in SIM card 123 in the electronic device 109, the service coordinator also selectively reports the SIM card change to the service provider 127, the manufacturer's environment 111 and to other systems that need to know about the change.

SIM card changes in the electronic device 109 are typically of two kinds—when a SIM card is initially inserted when the electronic device 123 is new and is being used for the first time, and when a SIM card is replaced by a different SIM card. In both the scenarios, the agent 125 of the electronic device determines the change in SIM card and selectively reports the SIM card change to the service coordinator 119.

If an end-user has a plurality of electronic devices 123 and uses the same SIM card 123 in each of them, then a change of SIM card 123 reported to the service coordinator 119 by the agent 125 of the electronic device 109 implies that the electronic device 109 has changed. In order to continue to provide the end-user with all the services subscribed to by the end-user, as referenced by the SIM card 123 information, despite the change of electronic devices 109, provisioning information, when available, is selectively accessed by the service coordinator 119 from the provisioning system 115. Thus, when the electronic device 109 reports a change in SIM card 123 and the SIM card 123 change is determined to be a change in electronic device 109, the service coordinator can access the provisioning information for the SIM card 123, including all services subscribed to by the end-user, and enable access to all those services via the changed electronic device 123.

In one embodiment, in order to determine a change in electronic device, if any, associated with a change in SIM card, the service coordinator 119 processes the received report of SIM card change provided by the electronic device 109 and looks into its database to determine if there is change of electronic device indicated. If it determines that the electronic device 109 has changed, based on make, model, version information received along with the SIM card change report, it takes action to ensure that the services associated with the SIM card (subscribed by the end-user) continue to be delivered on to the new electronic device, currently associated with the SIM card 123. To ensure that access to services subscribed to by the end-user are not interrupted, the service coordinator 119 coordinates the selective transfer of configuration information, preferences, software updates, device driver changes, firmware updates etc. from the manufacturer's environment 111, the service provider 127 or from its own database.

In another embodiment, the agent 125 of the electronic device 109 determines that the SIM card 123 has changed and reports the SIM card change to the service coordinator 119 over the communication link 113. The communication link 113 is an SMS link or a TCP/IP based link. Other types of communication links are also contemplated The service coordinator 119 saves the SIM card change information in its database and contacts the provisioning system 115 to access provisioning information and processes it. If it determines that the electronic device associated with the SIM card has changed, then it selectively determines if any service currently subscribed to by the end-user is effected by the change and communicates an appropriate message to the end-user via the electronic device 109. If any action needs to be taken by the end-user as a follow-up to ensure continuations of service(s), the end-user is provided with the appropriate prompts, end-user interactions are facilitated and end-user inputs are processed.

In one embodiment, the communications network 105 facilitates the selective download of software update packages, preferences, configuration information, etc. to the electronic device 109 over the communication link 113, following report of a change of SIM card at the electronic device 109.

In a different embodiment, the carrier network supports wireless communications and the communications network 105 makes it possible to conduct over-the-air (OTA) updates to firmware and software on the electronic device 109 following a change of SIM card 123 associated with the electronic device 109 or a change of electronic device 109 associated with the SIM card 123.

In general, if billing related information is to be collected for software or firmware packages transferred to the electronic device 109, the billing system 121 is employed by the carrier network 107. In addition to such collected billing information, activity logs are maintained by the carrier network 107 to keep track of the number of software/firmware downloads by the electronic device 109, the status of download attempts, etc.

In one embodiment, the manufacturer's environment 111 is combined with the service provider 127. In another embodiment, both the manufacturer's environment 111 and the service provider 127 is combined with the carrier network 107.

Figure 2:
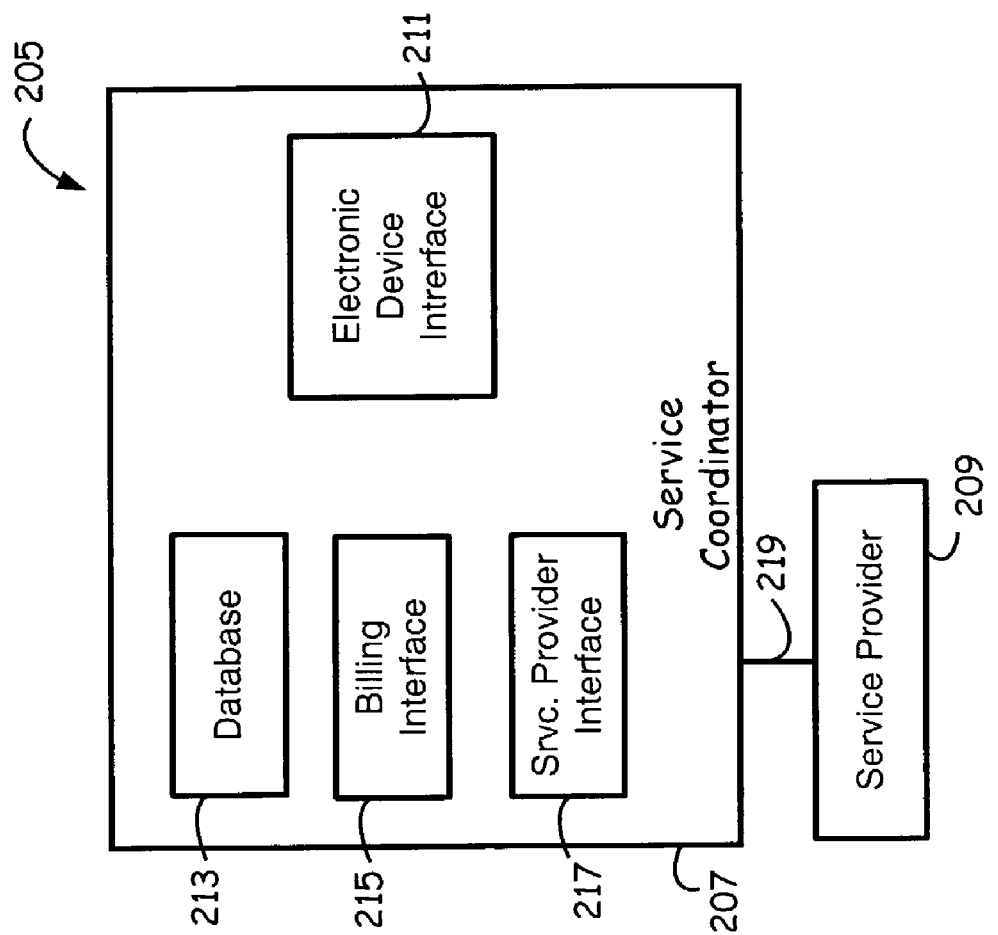
FIG. 2 is perspective block diagram of an exemplary service coordinator that selectively interacts with a service provider in order to communicate information regarding a change of SIM card by the electronic device.

FIG. 2 is perspective block diagram of an exemplary service coordinator 207 that selectively interacts with a service provider 209 in order to communicate information regarding a change of SIM card by the electronic device 109. The service coordinator 207 comprises a database 213, a billing interface 215, a service provider interface 217 and an electronic device interface 211. The electronic device interface is used to communicate with electronic devices over one or more communication links employing appropriate protocols. The billing interface 215 is employed to interact with billing systems to communicate information regarding any service provided to an electronic device by the service provider 209 or by the service coordinator 207. The service provider interface 217 is used to communicate with one or more service providers 209.

In one embodiment, the database 213 contains information about the end-user's SIM cards and electronic device information, such as make, model and version numbers. This information can be used to map a SIM card information to information regarding the electronic device. If a SIM card change is communicated by the electronic device the database is updated. If the electronic device type such as make, model, versions, etc. is also communicated to the service provider by the service coordinator 207, the mapping of SIM card to device type information in the database 213 is also updated. In a related embodiment, the database 213 also contains firmware/software and configuration information for electronic devices and services subscribed to by end-users.

Figure 3:
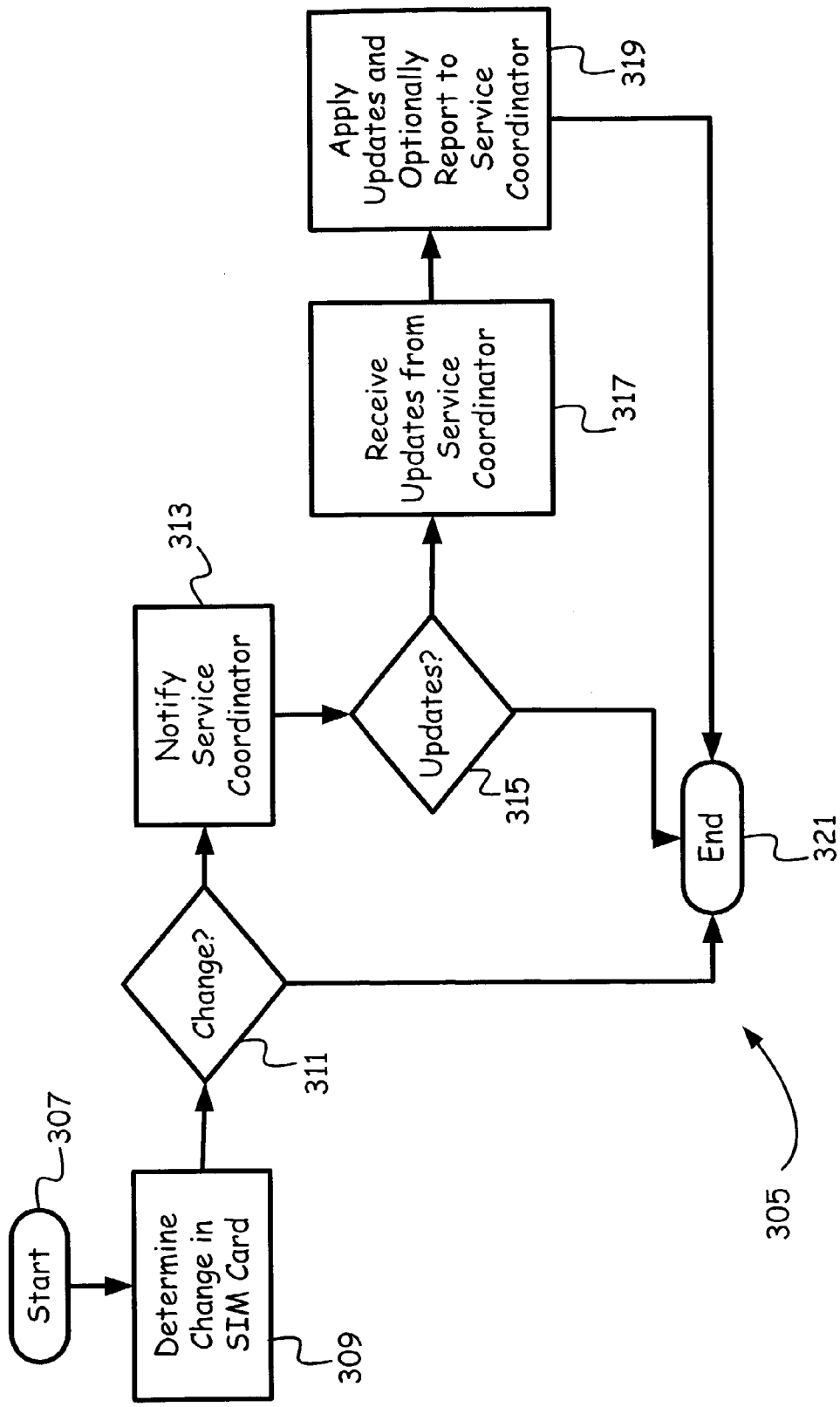
FIG. 3 is a block diagram describing the behavior of the electronic device that contains the agent.

FIG. 3 is a block diagram describing the behavior of the electronic device that contains the agent. At a start block 307, the processing starts, typically when the power in the electronic device is turned on and the agent is invoked. At the next block 309, the agent in the electronic device determines if the SIM card has been changed. In one embodiment, the electronic device stores the SIM card related information such as the issuing entity, the service associated, the identification of the end-user, etc. in non-volatile memory (such as FLASH memory) for subsequent access by the agent, such as during power-up. If a change in SIM card is detected at the next decision block 311, then a notification is sent to the service coordinator at the next block 313, otherwise, the processing ends at the end block 321.

When the notification is sent to the service coordinator at the block 313, the service coordinator may respond with a list of software updates or configuration updates that it may deem necessary. At the next decision box 315, a determination is made if updates are necessary. In one embodiment, the agent makes such determination based upon information available in the electronic device or based on information received from the service coordinator. In another embodiment, the service coordinator makes such determination and communicates it to the agent. If no updates are necessary or available, the process terminates at the end block 321. Otherwise, the agent selectively receives updates from service coordinator at the next block 317. In one embodiment, the end-user is prompted to initiate the communication of updates from the service coordinator. In another embodiment, the updates are automatically downloaded without end-user prompts.

Later, at the next block 319, the updates are selectively applied and the success or failure of the update operations are selectively reported to the service coordinator. Finally, the processing terminates at the end block 321.

FIG. 4 describes exemplary operation of the service coordinator in response to SIM card change information received from the agent in the electronic device. At a block 407, the processing starts. At a next block 409, the service coordinator receives notification from an agent in the electronic device indicating a change in SIM card. At a next block 411, the service coordinator saves the SIM card change information in the database. It then determines if any updates of software/firmware or configuration is necessitated by the SIM card change. If, at a next decision block 413, it is determined that updates are necessary, then updates are retrieved, if available, at a next block 415. Otherwise processing ends at the end block 421.

If updates are retrieved at the block 415 and communicated to the electronic device at the block 417, the agent in the electronic device selectively applies them. In one embodiment, the agent also acknowledges receipt of the updates and selectively acknowledges the successful application of the updates.

Later, any billing related activities are executed at a next block 419 before processing stops at the end block 412. Billing related activities may involve sending billing inputs to external systems or to internal billing systems.

FIG. 5 is an exemplary flow chart for the operation of the agent that describes the process of determining a SIM card change based on SIM card information previously saved in the electronic device. Processing starts at a block 507 when the electronic device is powered-up. At the next block 509, the agent in the electronic device reads the SIM card information. In one embodiment, the SIM card information includes the end-user's unique identity, the end-user's account number with a carrier or service provider, etc. Information typically available in a SIM card, such as a SIM card for a GSM phone, is also selectively read.

At the next block 511, the SIM card information read from the currently available SIM card is compared to SIM card information stored in non-volatile memory of the electronic device, such information having been previously saved in non-volatile memory. Later, at a next decision block 513, and attempt is made to determine if the SIM card has changed, based on the comparison of information retrieved from the SIM card with that stored in the electronic device.

If it is determined that the SIM card has not changed, then processing terminates at the end block 521.

If, at the decision block 513, it is determined that the SIM card has changed, then, at the next block 515, the SIM card change information is communicated to the service coordinator. Later, at a next block 517, the updates of software, firmware, configuration, etc. optionally communicated by the service coordinator is received, processed and selectively applied. Then, at a next block 519, the SIM card related information and a subset of information retrieved from the changed SIM card is stored in non-volatile memory. Finally, processing terminates at an end block 521.

In yet another embodiment of the present invention, the service coordinator is responsible for and capable of determining if a SIM card changed in an electronic device. In this embodiment, the agent in the electronic device selectively reports SIM card information whenever the electronic device is powered-up or whenever a SIM card related information is manipulated. The service coordinator stores SIM card information and other related information communicated to it by the agent. Whenever it receives SIM card information from the agent, it compares it to the stored information to detect a change in SIM card, if any. If it detects a SIM card change, it then selectively communicates the SIM card change to the manufacturer's environment, to the service provider(s) or to other external systems. It also selectively communicates updates of firmware, software, configuration and/or preferences to the electronic device.

In one embodiment, the service coordinator is located in the manufacturer's environment instead of the carrier network. In another embodiment, the service coordinator is located in the service provider instead of the carrier network. In a different embodiment, the service coordinator is located separately on its own, external to and communicatively coupled to the carrier network, the manufacturer's environment and the service provider(s).

In one generic embodiment, the electronic device has a programmed card reader, which may be a SIM card reader or a smart card reader or other type of card readers. Again, the electronic device has an intelligent agent, which can be an agent that supports selective downloads, uploads, or both, in addition to being able to apply updates of firmware, software, configuration and/or preferences. In one embodiment, the intelligent agent is implemented as a group of agents each responsible for different activities. The intelligent agent typically is capable of detecting a "programmed card changed event", when the programmed card employed by the electronic device is changed. Such a change may occur when a new electronic device is used for the first time and a programmed card is inserted into the programmed card reader of the electronic device, or when an end-user owns multiple electronic devices and shares the same programmed card between them.

In general, device specific information such as the make, model, version numbers of firmware, etc. is communicated to the service provider of the carrier network whenever the programmed card changed event is detected by the intelligent agent.

In one embodiment, the intelligent agent resides in the programmed card, such as a SIM card or a smart card, and helps detect a change in electronic device and generates a device changed event whenever the programmed card is inserted into a different electronic device, which is analogous to a programmed card changed event.

Although a system and method according to the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by this disclosure and appended diagrams.

We claim:

1. An electronic device with a programmed card reader, the electronic device communicatively coupled to a carrier network and capable of communicating with the carrier network when an authorized programmed card is docked in the programmed card reader, the electronic device comprising:

an intelligent agent capable of communicating with the carrier network;

the intelligent agent detecting the presence of the authorized programmed card in the programmed card reader of the electronic device;

the intelligent agent detecting when the authorized programmed card is changed, and, in response, communicating a programmed card changed event to the carrier network; and wherein the intelligent agent notifies a user of the electronic device, if delivery on the electronic device of a subscription service associated with the authorized programmed card is changed by an authorized programmed card change, based upon messaging received via the carrier network in response to communication of the programmed card change event.

2. The electronic device of claim 1 wherein the intelligent agent determines that the authorized programmed card that is currently employed in the programmed card reader of the electronic device in a current session is different from an authorized programmed card employed during a previous session, and, in response, communicates a programmed card changed event to the carrier network.

3. The electronic device of claim 2 wherein the electronic device communicates the programmed card changed event to the carrier network in order to initiate the determination of the availability of updates for the electronic device.

4. The electronic device of claim 3 further comprising:
a firmware;
a software;
a first agent component of the intelligent agent communicating the programmed card changed event to the carrier network in order to initiate the determination of the availability of updates for the electronic device;
the first agent component of the intelligent agent receiving one or more updates communicated by the carrier network in response to the programmed card changed event communicated by the electronic device; and
a second agent component of the intelligent agent applying the one or more updates to update or adapt the firmware and/or software in the electronic device.

5. The electronic device of claim 2 wherein the programmed card changed event communicated comprises identification information uniquely identifying the authorized programmed card that is currently employed in the programmed card reader of the electronic device in the current session and device type information of the electronic device.

6. The electronic device of claim 5 wherein the device type information comprises a selective combination of manufacturer, model, hardware version number, firmware version number and/or software version number.

7. The electronic device of claim 1 further comprising:
a programmed card in place of the authorized programmed card that is inserted into the programmed card reader;
a non-volatile storage area;
a stored data in the non-volatile storage area that is computed from information retrieved from the authorized programmed card inserted into the programmed card reader;
the intelligent agent capable of accessing, from the non-volatile storage area, the stored data;
the intelligent agent capable of reading an input data from the programmed card inserted into the programmed card reader;
the intelligent agent reading the input data from the programmed card when the programmed card is inserted into the programmed card reader, comparing it to the stored data stored in the non-volatile storage area whenever the programmed card is inserted into the programmed card reader, or whenever the electronic device is powered up, and detecting a programmed card changed event only when the stored data does not match the input data; and
the intelligent agent communicating the programmed card changed event to the carrier network whenever it detects the programmed card changed event.

8. The electronic device of claim 7 wherein the intelligent agent receives updates communicated by the carrier network in response to the programmed card changed event communicated by the electronic device to the carrier network.

9. The electronic device of claim 7 wherein the electronic device communicates the programmed card changed event to a service coordinator via the carrier network, that is communicatively coupled to the carrier network, that responds to the programmed card changed event communicated to it.

10. The electronic device of claim 7 further comprising:
the intelligent agent capable of assembling or retrieving a device specific information from the electronic device; and
the intelligent agent communicating the device specific information and the input data from the programmed card to the carrier network along with the programmed card changed event.

11. The electronic device of claim 10 wherein the electronic device is capable of interacting with the carrier network that maps the input data from the programmed card to the device specific information communicated by the intelligent agent.

12. A carrier network comprising:
a first electronic device with an intelligent agent communicatively coupled to the carrier network, the first electronic device comprising a programmed card reader and a first programmed card associated with the carrier network or a service provided by the carrier network;
a service coordinator that is communicatively coupled to the first electronic device;
a second electronic device with a second intelligent agent and a second programmed card reader also communicatively coupled to the service coordinator;
a first device specification in the first electronic device describing the device specifications of the first electronic device;
a second electronic device specification in the second electronic device describing the device specifications of the second electronic device;
wherein the second intelligent agent in the second electronic device detects the presence of the first programmed card when the first programmed card is introduced into the second programmed card reader of the second electronic device, and communicates a first programmed card information retrieved from the first programmed card to the service coordinator along with the second electronic device specification; and
wherein the second intelligent agent notifies a user of the second electronic device, if delivery on the second electronic device of a subscription service associated with the first programmed card is changed by introducing the first programmed card into the second programmed card reader of the second electronic device, based upon messaging received from the service coordinator.

13. The carrier network of claim 12 further comprising:
the service coordinator storing the first programmed card information that it receives from the second electronic device when the first programmed card replaces the second programmed card in the second electronic device and a communication is received from the second electronic device containing the first programmed card information along with the second electronic device specification;
the service coordinator determining that a programmed card changed event has occurred; and
the service coordinator determining the availability of updates for the second electronic device based on received second electronic device specification and communicating the availability of updates to the second electronic device.

14. The carrier network of claim 13 further comprising:
the service coordinator receiving the first programmed card information along with the second electronic device specification communicated by the intelligent agent in the second electronic device;
the service coordinator maintaining a saved mapping information that maps a plurality of known programmed card related information to associated known electronic devices;
the service coordinator detecting a programmed card changed event by comparing the received first programmed card information to the saved mapping information; and
the service coordinator associating the first programmed card with the second electronic device specifications and storing an association information as part of the saved mapping information.

15. The carrier network of claim 12 further comprising:
the intelligent agent in the second electronic device detecting the presence of the first programmed card and communicating a programmed card changed event to the service coordinator along with the second electronic device specification when the first programmed card is incorporated into the second programmed card reader of the second electronic device replacing the second programmed card; and
the service coordinator receiving the programmed card changed event and the second electronic device specifications communicated by the intelligent agent in the second electronic device and associating the first programmed card information with the second electronic device specification and creating a mapping that is saved for subsequent retrieval.

16. The carrier network of claim 15 further comprising:
services associated with first programmed card information;
the service coordinator facilitating delivery of the services associated with the first programmed card information;
the service coordinator facilitating the continuation of the delivery of services associated with first programmed card information to the second electronic device after the first programmed card is removed from the first electronic device and incorporated into the second electronic device.

17. The carrier network of claim 16 further comprising:
the service coordinator connectively coupled to an external entity such as a manufacturer's portal environment or a service provider's server; and
the service coordinator receiving the programmed card changed event communicated by the intelligent agent in the second electronic device and sending an associated message to the external entity.

18. The carrier network of claim 17 further comprising:
a new service supported by the service coordinator;
the service coordinator causing the external entity to selectively send at least one update package associated with the new service to the second electronic device from the external entity via the service coordinator in response to the associated message received by the external entity; and
the second electronic device, acting as a dynamic platform, accepting and installing the at least one update package associated with the new service.

19. The carrier network of claim 18 wherein the second electronic device further comprises firmware and software and wherein the at least one update package sent by the external entity to the second electronic device is an update to the firmware of the software, or both.

20. A mobile handset communicatively coupled to a cellular wireless network wherein the mobile handset comprises a subscriber identity module that identifies a subscriber's subscription to the cellular wireless network, the subscriber identity module being mounted in a programmed card, the programmed card capable of being inserted into any mobile handset that will accept the programmed card, the subscriber identity module, when inserted into the mobile handset as part of the programmed card, providing the cellular wireless network information about the subscriber that is necessary for one or both of establishing a call and billing, the mobile handset further comprising:
a non-volatile storage;
a previous card reference in the non-volatile storage for saving at least a portion of information provided by the subscriber identity module;
a device specification comprising at least a manufacturer, a model, and a firmware version of the mobile handset;
the mobile handset comparing the saved previous card reference to at least a portion of the information provided by the current subscriber identity module, on power up or on insertion of the programmed card containing the subscriber identity module into the mobile handset, and, if determined to be different, the mobile handset saving at least a portion of the information provided by the subscriber identity module in the previous card reference;
the mobile handset communicating a subscriber identity module changed event to the cellular wireless network when it determines that the saved previous card reference does not match the at least a portion of the information provided by the current subscriber identity module; and
wherein the mobile handset notifies a user, if delivery of an existing subscription service is changed by changing the subscriber identity module in the mobile handset, based upon messaging received via the cellular wireless network in response to communication of the subscriber identity module changed event.

21. An electronic device communicatively coupled to a carrier network, the electronic device comprising:
a card reader for accepting an authorized programmed card;
an intelligent agent enabled to communicate with the carrier network, the intelligent agent communicatively coupled to the card reader;
wherein the intelligent agent detects a first authorized programmed card operably coupled to the card reader;
wherein the intelligent agent communicates a programmed card changed event, via the carrier network, upon detecting a second authorized programmed card operably coupled to the card reader, that is different from the first authorized programmed card; and
wherein the intelligent agent notifies a user of the electronic device, if delivery on the electronic device of a subscription service is changed by an authorized programmed card change, based upon messaging received via the carrier network in response to communication of the programmed card change event.

22. The electronic device of claim 21, wherein the intelligent agent communicates a programmed card changed event to the carrier network upon determining that the second authorized programmed card is different from any previous authorized programmed card operably coupled to the card reader.

23. The electronic device of claim 21, wherein communication of the programmed card changed event to the carrier network initiates determination of availability of updates for the electronic device.

24. The electronic device of claim 21, wherein the programmed card changed event comprises information uniquely identifying the authorized programmed card operably coupled to the programmed card reader, and device type information of the electronic device.

25. The electronic device of claim 24, wherein the device type information comprises information identifying at least one of the following: a manufacturer, a model, a hardware version number, a firmware version number, and a software version number.

26. The electronic device of claim 21, further comprising:
at least one memory having stored therein one or both of firmware and software;
wherein the intelligent agent comprises at least a first agent component and a second agent component;
wherein communication of the programmed card changed event initiates determination of the availability of one or more updates for the electronic device, by the carrier network;
wherein the first agent component functions, at least, to receive the one or more updates; and
wherein the second agent component functions, at least, to apply the one or more updates to update the at least one memory, in the electronic device.

27. The electronic device of claim 21, further comprising:
at least one non-volatile memory comprising data computed from information in the first authorized programmed card;
wherein the intelligent agent functions to compare the computed data to data from the second programmed card upon one or both of insertion of the second programmed card into the card reader, and power-up of the electronic device;
wherein the intelligent agent functions to detect a programmed card changed event, when the computed data does not match the data from the second programmed card; and
wherein the intelligent agent functions to communicate the programmed card changed event to the carrier network upon detection of the programmed card changed event.

28. The electronic device of claim 27, wherein the intelligent agent functions to receive updates communicated by the carrier network in response to the programmed card changed event communicated by the electronic device to the carrier network.

29. The electronic device of claim 27, wherein the electronic device communicates the programmed card changed event to a service provider via and external to the carrier network, that responds to the programmed card changed event.

30. The electronic device of claim 27, further comprising:
wherein the intelligent agent one or both of assembles and retrieves device specific information from the electronic device; and
wherein the intelligent agent communicates the device specific information and the data from the second programmed card to the carrier network along with the programmed card changed event.

31. The electronic device of claim 30 wherein the carrier network maps the data from the second programmed card to the device specific information.

32. A carrier network comprising:
a service coordinator that is communicatively coupled to a first electronic device and a second electronic device;
wherein the first electronic device comprises a first intelligent agent communicatively coupled to the carrier network, a first card reader, a first programmed card associated with a first set of services, and a first device specification descriptive of the first electronic device;
wherein the second electronic device comprises a second intelligent agent communicatively coupled to the carrier network, a second card reader, a second programmed card associated with a second set of services, and a second device specification descriptive of the second electronic device;
wherein the second intelligent agent detects insertion of the first programmed card into the second card reader, and communicates to the service coordinator the second device specification and information retrieved from the first programmed card; and
wherein the second intelligent agent notifies a user of the second electronic device, if delivery on the second electronic device of a subscription service associated with the first programmed card is changed by introducing the first programmed card into the second card reader of the second electronic device, based upon messaging received from the service coordinator.

33. The carrier network of claim 32, wherein the service coordinator:
stores the information retrieved from the first programmed card and the second device specification;
detects that a programmed card changed event has occurred;
determines update availability for the second electronic device, based upon the received second device specification; and
communicates availability of an update, to the second electronic device.

34. The carrier network of claim 33, wherein the service coordinator:
maintains a store of information mapping at least one programmed card to at least one associated electronic device;
detects the programmed card changed event by comparing the received information retrieved from the first programmed card to the stored mapping information; and
stores, as part of the stored mapping information, an association of the first programmed card with the second device specification.

35. The carrier network of claim 32, wherein the second intelligent agent, upon detecting replacement of the second programmed card with the first programmed card, communicates to the service coordinator a programmed card changed event and the second device specification, and wherein the service coordinator upon receiving the programmed card changed event and the second electronic device specifications, associates the first programmed card information with the second device specification and creates a mapping that is saved for subsequent retrieval.

36. The carrier network of claim 35, wherein the service coordinator facilitates continuation of delivery of the first set of services associated with the first programmed card, by the second electronic device.

37. The carrier network of claim 36, wherein upon receiving a programmed card changed event, the service coordinator facilitates continuation of delivery of the first set of services by causing an entity external to the carrier network to send, to the second electronic device, at least one update package associated with a new service not in the second set of services; and by causing the second electronic device, acting as a dynamic platform, to accept and install the at least one update package associated with the new service.

38. The carrier network of claim 37 wherein the second electronic device further comprises one or both of firmware and software, and wherein the at least one update package sent to the second electronic device by the entity external to the carrier network, is an update to the one or both of firmware and software.

39. A mobile handset communicatively coupled to a cellular wireless network, the mobile handset comprising:

- a subscriber identity module comprising service subscription information, the subscriber identity module contained in a programmed card for operable coupling to a compatible mobile handset;
- at least one non-volatile storage containing a previous card reference comprising at least a portion of information saved from a subscriber identity module of a previously operably coupled programmed card;
- a device specification comprising information representing one or more of a manufacturer, a model, and a firmware version of the mobile handset;
- wherein upon power up, or upon a change to a different operably coupled programmed card, the mobile handset determines whether the previous card reference matches at least a portion of the information of a subscriber identity module of a currently operably coupled programmed card and, if no match exists, the mobile handset saves in the previous card reference, at least a portion of the information provided by the subscriber identity module of the currently operably coupled programmed card;
- wherein the mobile handset then communicates to the cellular wireless network a subscriber identity module changed event; and
- wherein the mobile handset notifies a user that delivery of a subscription service is changed based upon determination by the mobile handset that the previous card reference does not match the information of a subscriber identity module of a currently operably coupled programmed card.

* * * * *

UNITED STATES PATENT AND TRADEMARK OFFICE
CERTIFICATE OF CORRECTION

PATENT NO. : 7,369,851 B2  
APPLICATION NO. : 10/417285  
DATED : May 6, 2008  
INVENTOR(S) : Harri Okonnen et al.

Page 1 of 1

It is certified that error appears in the above-identified patent and that said Letters Patent is hereby corrected as shown below:

On the face page, in field (75), in "Inventors", in column 1, line 1, delete "Okonnen" and insert -- Okkonen --, therefor.

In column 6, line 20, delete "SIN" and insert -- SIM --, therefor.

In column 6, line 37, delete "11" and insert -- 111 --, therefor.

In column 7, line 37, delete "continuations" and insert -- continuation --, therefor.

Signed and Sealed this

Second Day of September, 2008

JON W. DUDAS  
*Director of the United States Patent and Trademark Office*